(12) United States Patent
Kuchiki

(10) Patent No.: US 10,200,612 B2
(45) Date of Patent: Feb. 5, 2019

(54) IMAGE STABILIZATION APPARATUS AND CONTROL METHOD THEREOF, AND STORAGE MEDIUM

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/450,622

(22) Filed: Mar. 6, 2017

(65) Prior Publication Data

US 2017/0264824 A1 Sep. 14, 2017

(30) Foreign Application Priority Data

Mar. 8, 2016 (JP) ................................. 2016-044763

(51) Int. Cl.
| | | |
|---|---|---|
| *H04N 5/232* | (2006.01) | |
| *G06T 7/11* | (2017.01) | |
| *G06T 7/00* | (2017.01) | |
| *G06T 7/70* | (2017.01) | |

(52) U.S. Cl.
CPC ........... *H04N 5/23267* (2013.01); *G06T 7/11* (2017.01); *G06T 7/70* (2017.01); *G06T 7/97* (2017.01); *H04N 5/23254* (2013.01); *H04N 5/23258* (2013.01); *H04N 5/23261* (2013.01); *G06T 2207/10004* (2013.01); *G06T 2207/20201* (2013.01)

(58) Field of Classification Search
CPC .............................. H04N 5/23267; G06T 7/97
See application file for complete search history.

(56) References Cited

U.S. PATENT DOCUMENTS

| | | | | |
|---|---|---|---|---|
| 6,173,121 | B1 * | 1/2001 | Tomita | ..................... G03B 5/00 396/52 |
| 8,497,918 | B2 * | 7/2013 | Miyasako | .......... H04N 5/23254 348/208.99 |
| 9,264,616 | B2 * | 2/2016 | Miyasako | .......... H04N 5/23254 |
| 2007/0183765 | A1 * | 8/2007 | Imamura | .................. G03B 5/02 396/55 |

(Continued)

FOREIGN PATENT DOCUMENTS

| | | | | |
|---|---|---|---|---|
| JP | 2006-317848 A | 11/2006 | | |
| JP | 2006317848 A | * 11/2006 | ............... | G03B 5/00 |
| JP | 2014211531 A | * 11/2014 | ............... | G03B 5/00 |

*Primary Examiner* — Cynthia Segura

(74) *Attorney, Agent, or Firm* — Cowan, Liebowitz & Latman, P.C.

(57) ABSTRACT

An image stabilization apparatus includes: a first calculation unit that calculate an angular velocity; a second calculation unit that calculates a motion vector of an object; a third calculation unit that calculates a current position of an image stabilization unit; a fourth calculation unit that calculates an angular velocity of a motion of the object; and a control unit. The control unit controls, before the image capturing apparatus is released, the image stabilization unit so as to correct an image blur, moves, an output position of an image from the image capturing unit, and controls, after the image capturing unit has started exposure, so as to correct an image blur based on an angular velocity of the image capturing apparatus and an angular velocity of the object.

17 Claims, 12 Drawing Sheets

(56) References Cited

U.S. PATENT DOCUMENTS

| | | | |
|---|---|---|---|
| 2011/0317024 A1* | 12/2011 | Miyasako | H04N 5/23254 348/208.11 |
| 2014/0111658 A1* | 4/2014 | Watanabe | H04N 5/23267 348/208.1 |
| 2014/0184834 A1* | 7/2014 | Miyasako | H04N 5/23254 348/208.1 |
| 2015/0281587 A1* | 10/2015 | Furuta | B60R 1/00 348/240.2 |
| 2016/0261784 A1* | 9/2016 | Mukunashi | H04N 5/2353 |
| 2016/0316146 A1* | 10/2016 | Kajimura | H04N 5/23287 |
| 2017/0013198 A1* | 1/2017 | Wada | G03B 5/00 |
| 2017/0134658 A1* | 5/2017 | Miyahara | H04N 5/23258 |
| 2017/0134659 A1* | 5/2017 | Miyahara | H04N 5/23251 |
| 2017/0155842 A1* | 6/2017 | Takayanagi | G06T 5/003 |
| 2017/0223272 A1* | 8/2017 | Aoyama | H04N 5/23241 |
| 2017/0347032 A1* | 11/2017 | Kajimura | H04N 5/23287 |
| 2018/0146142 A1* | 5/2018 | Kuchiki | H04N 5/23258 |

\* cited by examiner

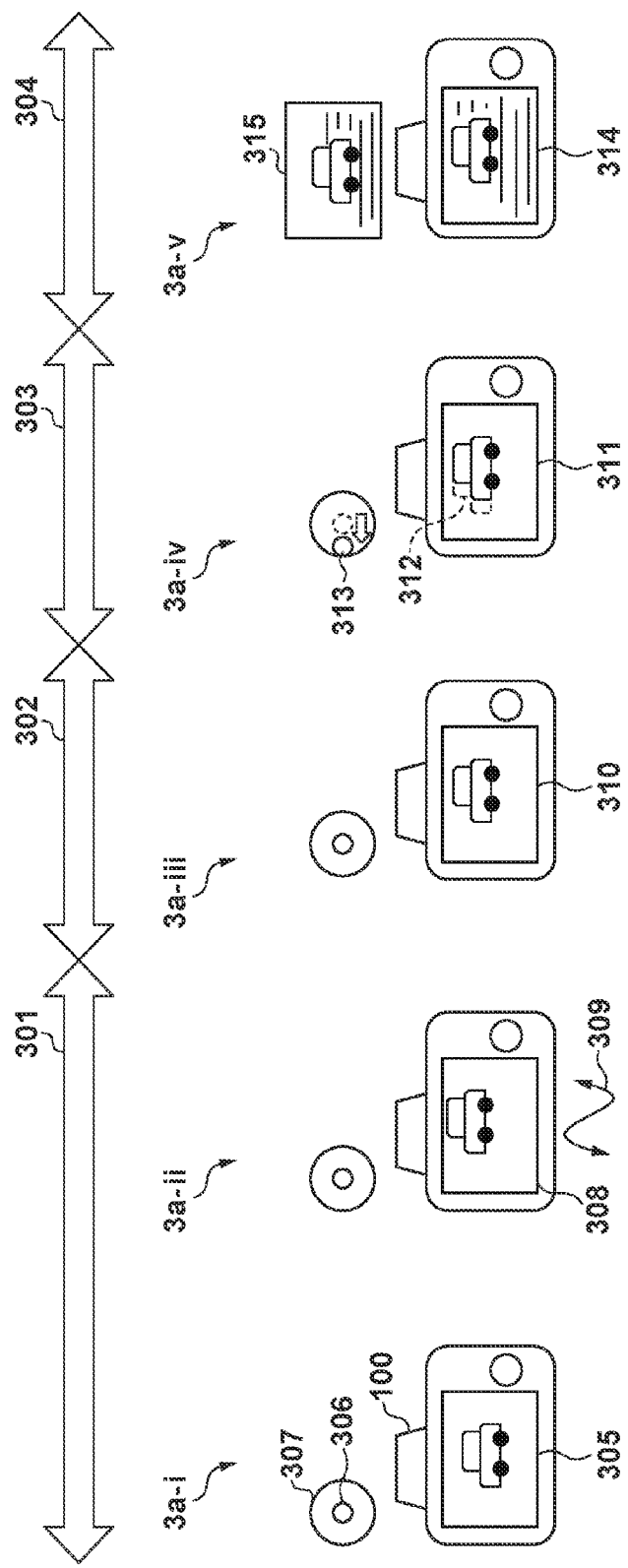

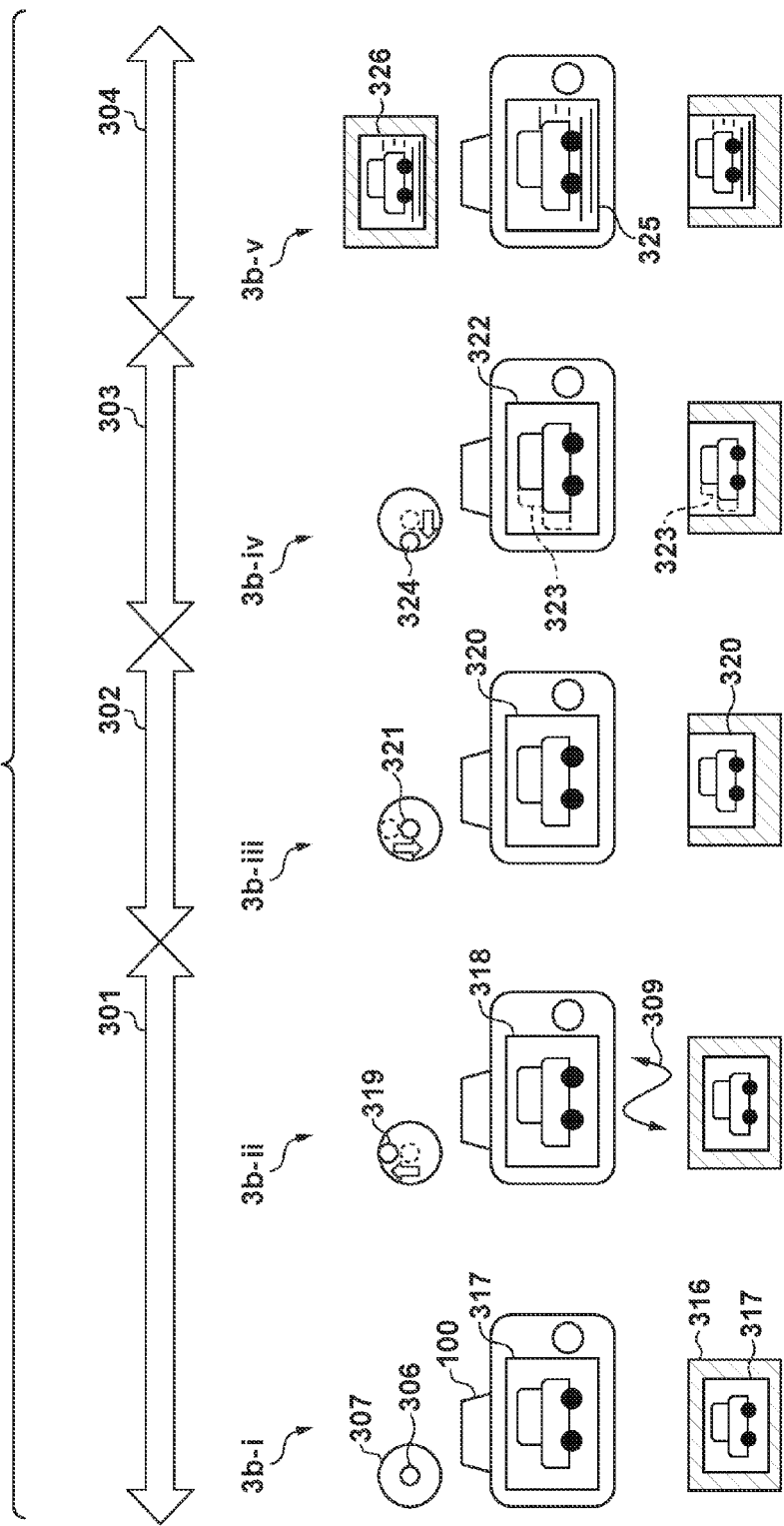

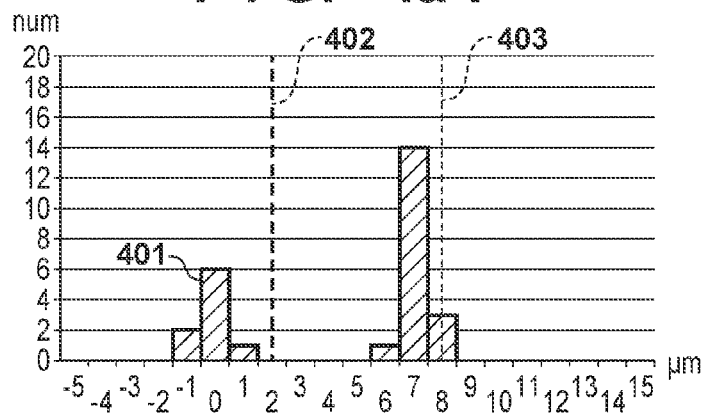
FIG. 4a-i
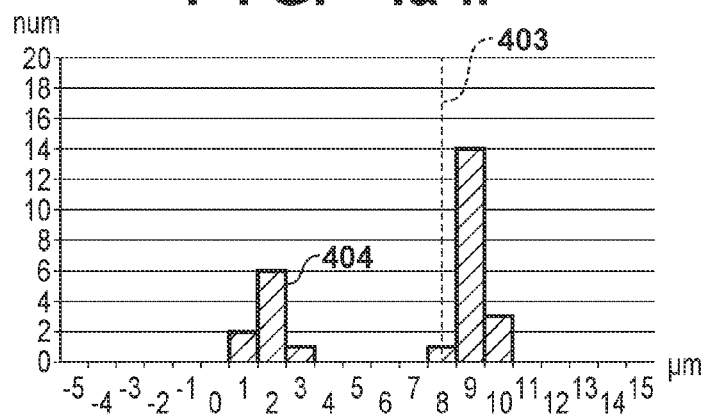
FIG. 4a-ii
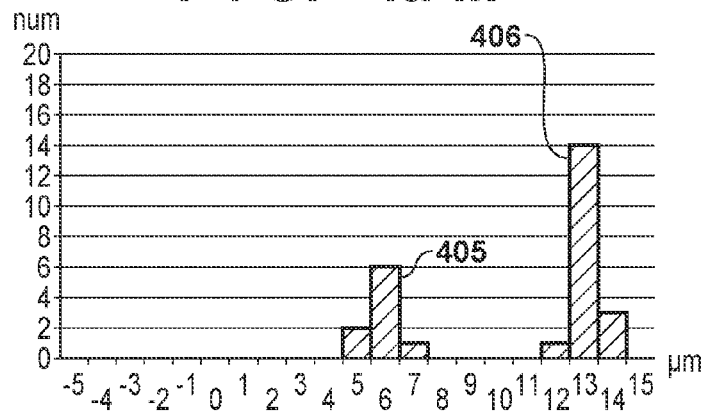
FIG. 4a-iii

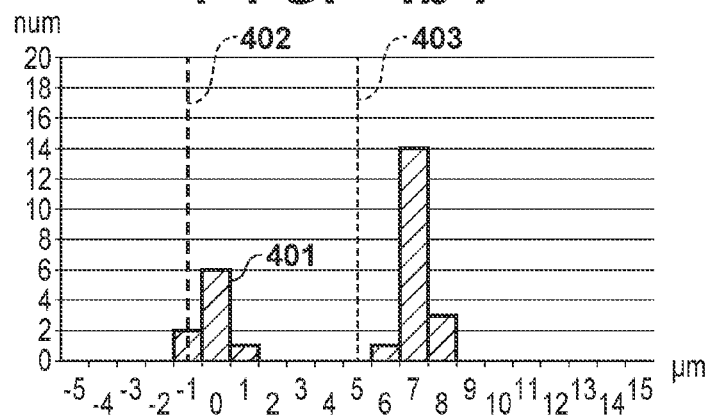
FIG. 4b-i
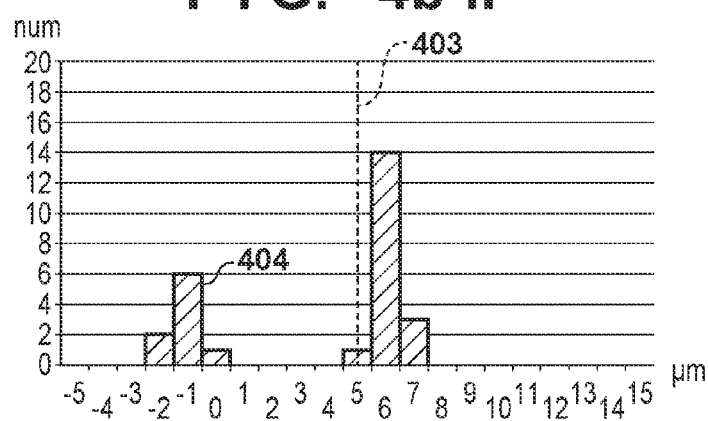
FIG. 4b-ii
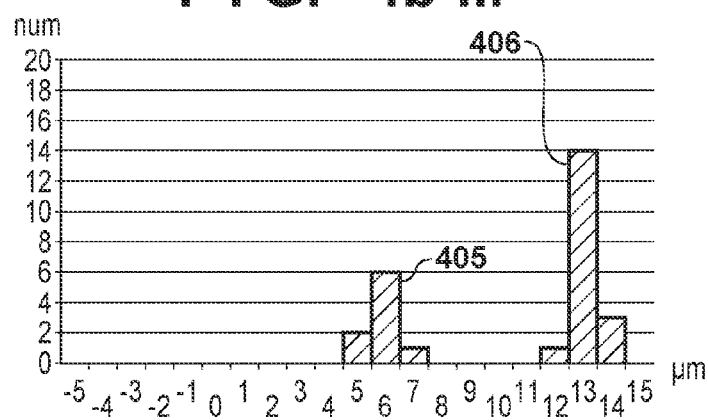
FIG. 4b-iii

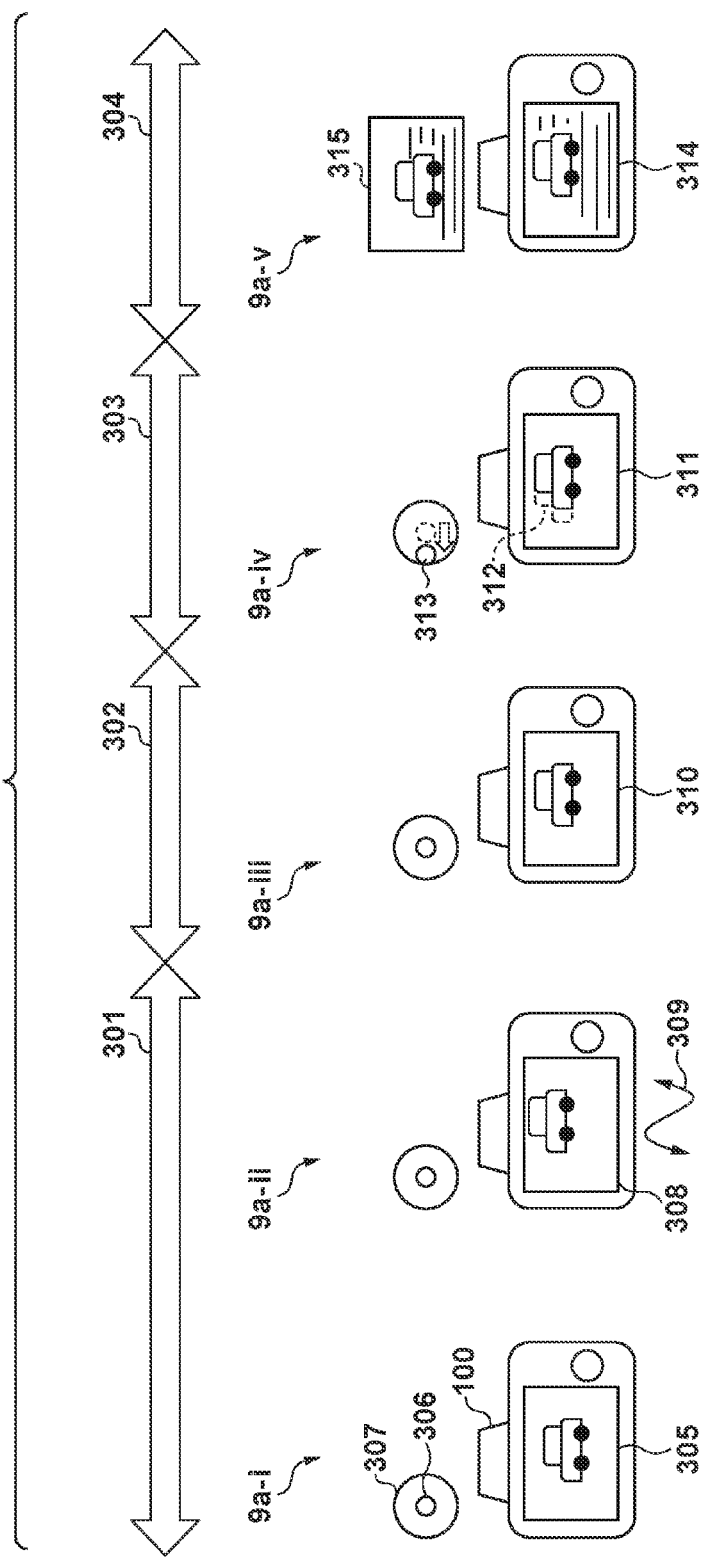

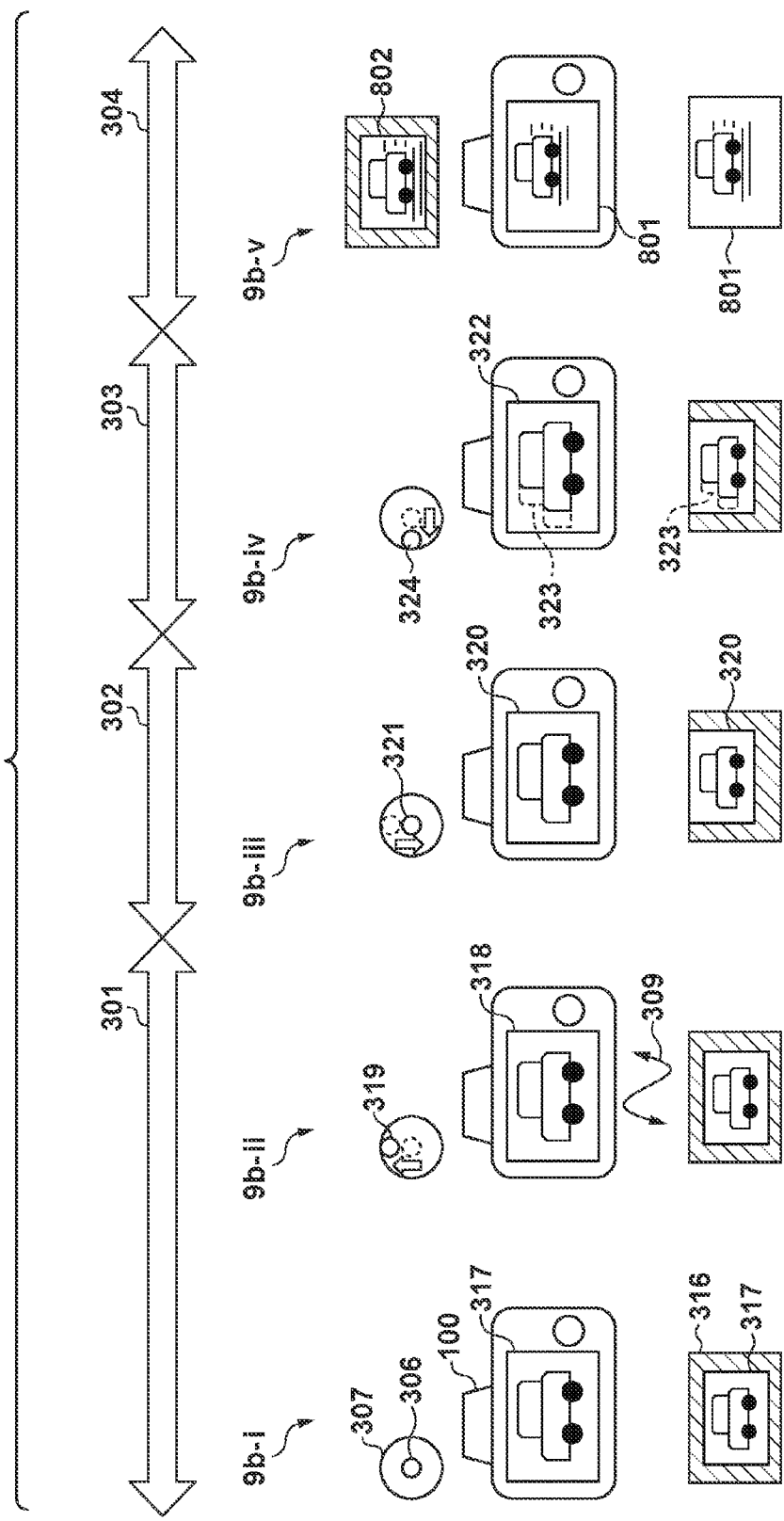

IMAGE STABILIZATION APPARATUS AND CONTROL METHOD THEREOF, AND STORAGE MEDIUM

BACKGROUND OF THE INVENTION

Field of the Invention

The present invention relates to a technique for assisting a panning shot using an image stabilization apparatus that corrects image blur caused by camera shake due to a user, or the like.

Description of the Related Art

Panning shots using a camera is a method in which, when an object (moving body) is shot, the object is shot at a shutter speed that is slower than usual while the object is followed. With this method, an image can be obtained in which the background appears to flow and the object is stationary. A user can shoot a photograph brimming with a sense of speed with a panning shot. However, because shooting with a relatively long exposure time is performed, it is difficult to adjust the panning speed to the speed of the object during the exposure period, and therefore, the panning shot is a difficult shooting technique in which experience is needed.

In order to realize the panning shot in a simple manner, a method in which the difference between the object speed and the panning speed of the camera is detected, and a shift amount corresponding to the difference is corrected using a camera shake correction function is disclosed in Japanese Patent-Laid Open No. 2006-317848. Immediately before shooting, an angular velocity of the panning of the camera following the object is detected by an angular velocity sensor in the camera. At the same time, a moving amount of a main object image on an imaging plane is detected. An angular velocity of the object is calculated from the detected panning angular velocity and the moving amount of the object image on the imaging plane. Then, during exposure, an image stabilization operation is performed according to the amount of difference between the calculated angular velocity of the main object and the output of the angular velocity sensor in the camera. Accordingly, the difference between the speed of the main object and the panning speed of the camera, and the camera shake amount are corrected, and therefore, image blur of the main object, which is the panning shot target, can be suppressed.

However, in the conventional technology disclosed in Japanese Patent Laid-Open No. 2006-317848 described above, in the case of following the object at a stage prior to shooting, the camera shake correction function is stopped in order to accurately detect the moving amount of the object image on the imaging plane. Therefore, when a lens having a long focal length is used, specifically, it is difficult to stably keep the main object within the angle of view due to the influence of camera shake, and as a result, problems such as missing a photo opportunity arise.

SUMMARY OF THE INVENTION

The present invention has been made in view of the above-mentioned problems, and provides an image stabilization apparatus that can stabilize an operation of following an object before shooting, and can appropriately assist panning shot at shooting.

According to a first aspect of the present invention, there is provided an image stabilization apparatus comprising: a first calculation unit that calculates an angular velocity of a motion of an image capturing apparatus; a second calculation unit that calculates a motion vector of an object from a plurality of images that have been captured by an image capturing unit of the image capturing apparatus; a third calculation unit that calculates a current position of an image stabilization unit that corrects image blur caused by the motion of the image capturing apparatus; a fourth calculation unit that calculates an angular velocity of a motion of the object based on outputs of the first to third calculation units; and a control unit that controls, before the image capturing apparatus is released, the image stabilization unit so as to correct an image blur based on an output of the first calculation unit, moves, along with moving a position of the image stabilization unit at a predetermined timing after the image capturing apparatus has been released, an output position of an image from the image capturing unit based on a moving amount of the movement, and controls, after the image capturing unit has started exposure, the image stabilization unit so as to correct an image blur based on the angular velocity of the motion of the image capturing apparatus calculated by the first calculation unit and the angular velocity of the motion of the object calculated by the fourth calculation unit.

According to a second aspect of the present invention, there is provided a control method of an image stabilization apparatus, the control method comprising: a first calculation step of calculating an angular velocity of a motion of an image capturing apparatus; a second calculation step of calculating a motion vector of an object from a plurality of images that have been captured by an image capturing unit of the image capturing apparatus; a third calculation step of calculating a current position of an image stabilization unit that corrects image blur caused by the motion of the image capturing apparatus; a fourth calculation step of calculating an angular velocity of a motion of the object based on outputs of the first to third calculation steps; and a control step of controlling, before the image capturing apparatus is released, the image stabilization unit so as to correct an image blur based on an output in the first calculation step, moving, along with moving a position of the image stabilization unit at a predetermined timing after the image capturing apparatus has been released, an output position of an image from the image capturing unit based on a moving amount of the movement, and controlling, after the image capturing unit has started exposure, the image stabilization unit so as to correct an image blur based on the angular velocity of the motion of the image capturing apparatus calculated in the first calculation step and the angular velocity of the motion of the object calculated in the fourth calculation step.

Further features of the present invention will become apparent from the following description of exemplary embodiments with reference to the attached drawings.

BRIEF DESCRIPTION OF THE DRAWINGS

FIGS. 3A and 3B are diagrams illustrating a flow of operations in the panning shot assistance in the first embodiment.

FIGS. 4*a-i* to 4*b-iii* are diagrams illustrating a method of calculating an object angular velocity in the first embodiment.

FIGS. 9A and 9B are diagrams illustrating a flow of operations in the panning shot assistance in the second embodiment.

DESCRIPTION OF THE EMBODIMENTS

Hereinafter, embodiments of the present invention will be described in detail with reference to the accompanying drawings.

First Embodiment

Figure 1:
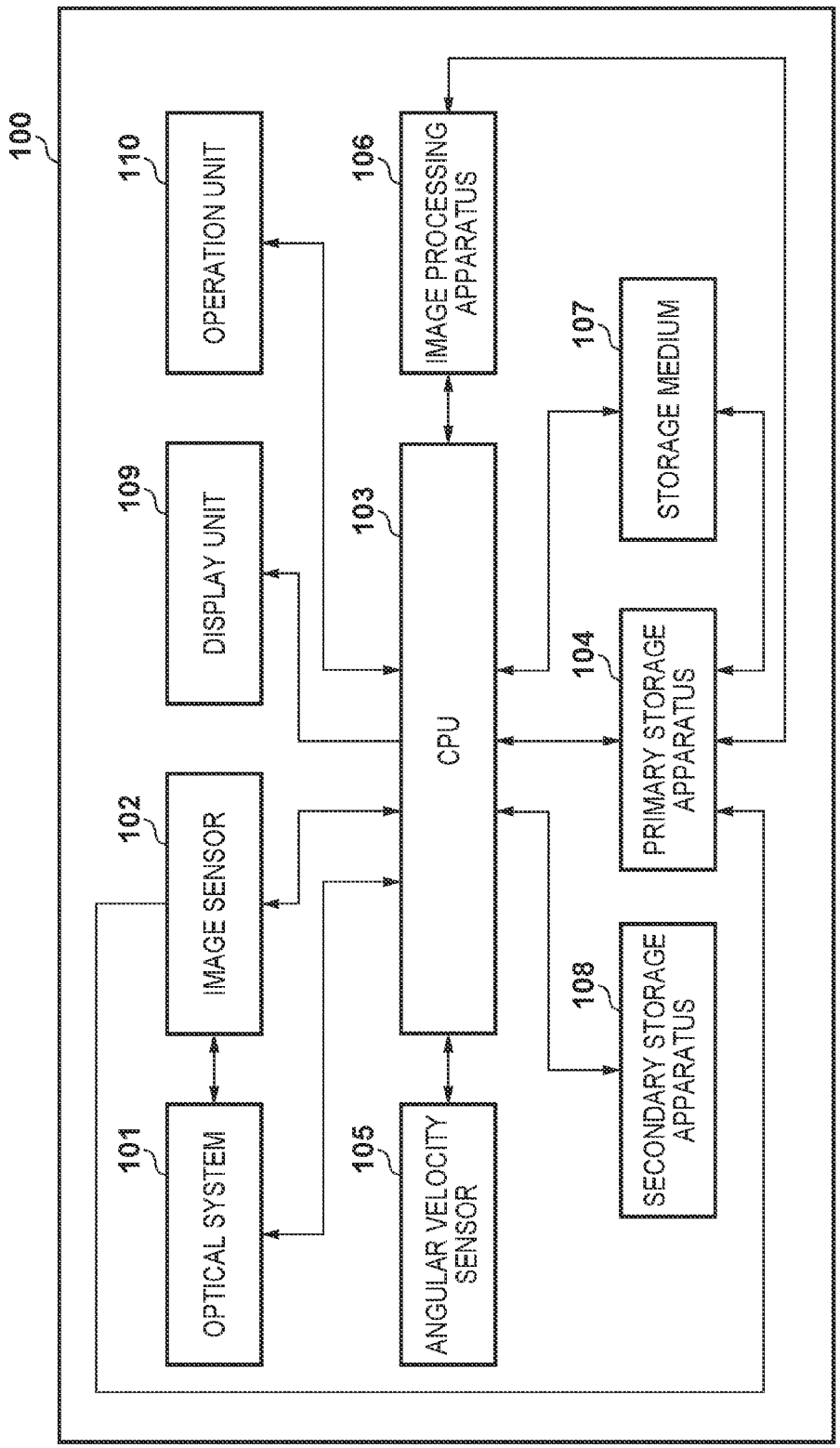
FIG. 1 is a block diagram illustrating a configuration of an image capturing apparatus according to a first embodiment of the present invention.

FIG. 1 is a block diagram illustrating a basic configuration of an image capturing apparatus 100 on which an image stabilization apparatus according to a first embodiment of the present invention is mounted. The image capturing apparatus 100 is a camera such as a digital camera and a digital video camera obviously, and may be an arbitrary electronic device that includes a camera function such as a mobile phone having a camera function or a computer having a camera.

In FIG. 1, an optical system 101 is configured by a lens, a shutter, and a diaphragm, and forms an image on an image sensor 102 with light from the object by control of a CPU 103. The image sensor 102 constituted by a CCD image sensor, a CMOS image sensor, or the like, converts light that is incident thereon through the optical system 101 to an image signal. An angular velocity sensor 105 such as a gyro sensor detects an angular velocity that represents a moving amount of the image capturing apparatus 100, converts the angular velocity to an electric signal, and transmits the electric signal to the CPU 103.

The CPU 103 realizes functions of the image capturing apparatus 100 by controlling units that constitute the image capturing apparatus 100 in accordance with an input signal and a pre-stored program. A primary storage apparatus 104 is a volatile apparatus such as a RAM, stores data temporarily, and is used as a work area of the CPU 103. Also, information stored in the primary storage apparatus 104 is used in an image processing apparatus 106, and is recorded to a storage medium 107 as well. A secondary storage apparatus 108 is a nonvolatile memory such as an EEPROM, for example, and stores a program (firmware) for controlling the image capturing apparatus 100 and various types of setting information, which are to be used by the CPU 103.

The storage medium 107 records image data that is obtained by shooting and the like that is stored in the primary storage apparatus 104. Note that the storage medium 107 is a semiconductor memory card or the like, and is removable from the image capturing apparatus 100. The recorded data therein can be read out by mounting the storage medium 107 to a personal computer or the like. That is, the image capturing apparatus 100 includes a detachable mechanism and a read/write function for the storage medium 107. A display unit 109 displays a view finder image at shooting, a captured image, a GUI image for an interactive operation, and the like.

An operation unit 110 is a group of input devices, such as, obviously, a button, a lever, and a touch panel, for example, that receive a user operation and transmit input information to the CPU 103, or may be an input device that utilizes voice, a gaze point, or the like. Note that, in the image capturing apparatus 100 of the present embodiment, the image processing apparatus 106 includes a plurality of patterns of image processing that are applied to the captured image, and the pattern can be set from the operation unit 110 as the image capturing mode. The image processing apparatus 106 performs image processing that is referred to as so-called development processing, adjustment of color tone according to the image capturing mode, and the like. Note that at least some of the functions of the image processing apparatus 106 may be realized by the CPU 103 with the use of software.

Figure 2:
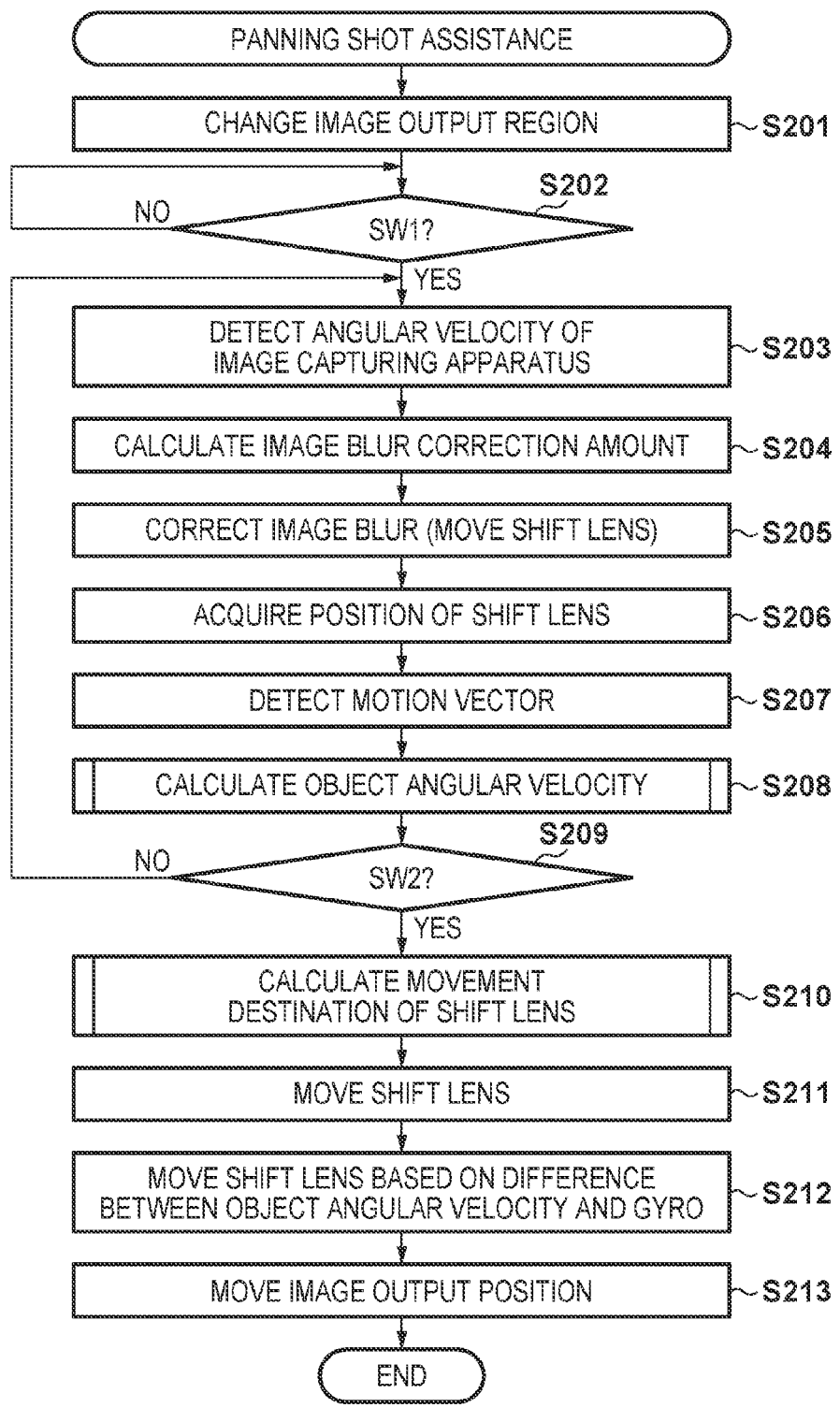
FIG. 2 is a flowchart illustrating a flow of panning shot assistance in the first embodiment.

FIG. 2 is a flowchart illustrating a flow of operations for assisting the panning shot in the present embodiment. First, in step S201, the CPU 103 limits an image output region to an image center portion that is set for a panning shot assistance mode, and displays the image output region in the display unit 109. In step S202, the CPU 103 determines whether or not a shutter button (a release button of the operation unit 111) is half-pressed (hereinafter, referred to as a switch SW1 being turned on). In the case where the switch SW1 is not turned on, the CPU 103 waits until the switch SW1 is turned on. Then, when the switch SW1 is turned on, the processing advances to step S203 and onwards. Note that the flow in which the processing is advanced, initiated by turning on of the switch SW1, to step S203 and onwards is an example, and the flow may be such that the processing in step S203 and onwards is always performed, the processing being initiated by entering the panning shot assistance mode.

In step S203, the CPU 103 acquires an angular velocity of the image capturing apparatus 100 detected by the angular velocity sensor 105. In step S204, the CPU 103 calculates an image blur correction amount, which is the moving amount of a shift lens, for correcting image blur caused by camera shake or the like, by subjecting the angular velocity of the image capturing apparatus 100 acquired in step S203 to high pass filtering (HPF) (filtering processing). In step S205, the CPU 103 moves a shift lens 306 (refer to FIGS. 3A and 3B) included in the optical system 101 so as to correct the image blur based on the image blur correction amount calculated in step S204.

Here, the processing in steps S203 to S205 in FIG. 2 will be specifically described using FIGS. 3A and 3B. FIGS. 3A and 3B are diagrams illustrating the flow of operations in the panning shot assistance mode in the present embodiment. FIGS. 3A:3a-i to 3a-v illustrate a flow in a conventional panning shot assistance mode, and FIGS. 3B:3b-i to 3b-v illustrate a flow in the panning shot assistance mode of the present embodiment. A reference sign 301 in FIGS. 3A and 3B indicates a period of a preliminary operation in which a user follows the object by panning the image capturing apparatus. The processing in steps S203 to S208 in FIG. 2 is performed frame by frame in a live view operation of the image capturing apparatus in this preliminary operation period 301.

First, the flow in the conventional panning shot assistance mode will be described using FIGS. 3A:3a-i to 3a-v. Assuming that reference sign 315 shown in FIG. 3A:3a-v is an angle of view of the image to be shot, the user pans the image capturing apparatus 100 so as to have the angle of view indicated by the reference sign 305 in FIG. 3A:3a-i as a preparatory operation before shooting. In FIG. 3A:3a-i, the range in which the shift lens 306 can move is referred to as a movable range 307. In the conventional panning shot assistance mode, the position of the shift lens 306 is fixed to a center position of the movable range 307 in order to secure an image blur correction amount in an exposure period 303. Therefore, the object moves within the angle of view due to the influence of a camera shake 309, as shown by reference sign 308, and as a result, it is difficult to follow the object.

Next, the flow in the panning shot assistance mode of the present embodiment will be described using FIGS. 3B:b-i to 3b-v. In the present embodiment, as shown in step S203 in FIG. 2 as well, the output region of an image is limited to the range of a limited region 317 from the entire region of the imaging plane (entire image region) 316 in order to correct the camera shake 309. Therefore, the angle of view of an image to be shot is set to an angle of view 326 in which the output region is limited, as shown in FIG. 3B:3b-v. Also, in the preparatory operation (preliminary operation period 301) before shooting, the shift lens 306 is caused to move, as shown by reference sign 319 in FIG. 3B:3b-ii, based on an image blur correction amount calculated in step S204 in FIG. 2 so as to perform image blur correction. Accordingly, the image blur correction in the preliminary operation period 301 is realized.

In step S206 in FIG. 2, the CPU 103 acquires the current position (hereinafter, referred to as actual position) of the shift lens 306 (optical system 101) that was moved in step S205. Then, the CPU 103 converts the displacement amount of the acquired position of the shift lens 306 to a moving amount 1 [mm] on the imaging plane. In step S207, the CPU 103, after dividing images that have been successively acquired with the image sensor 102 into a plurality of block regions, detects motion vectors between two or more images using the image processing apparatus 106. Then, the detected motion vectors are converted into moving amounts v [mm] on the imaging plane.

In step S208, the CPU 103 calculates the object angular velocity using the angular velocity of the image capturing apparatus 100 that has been acquired in step S203, the actual position of the shift lens 306 that has been acquired in step S206, and the motion vectors that have been converted into a moving amount on the imaging plane in step S207. Note that the angular velocity $\omega$ [rad/sec] of the image capturing apparatus 100 is converted into a moving amount a [mm] on the imaging plane between images using the equation (1), where f [mm] is the focal length, and fps [frame/sec] is the number of acquired images per second (hereinafter, referred to as a frame rate).

$$a = f \times \tan(\omega/\text{fps}) \quad (1)$$

Here, the calculation method of the object angular velocity in the present embodiment will be described using FIGS. 4a-i to 4b-iii and FIG. 5. FIGS. 4a-i to 4b-iii are diagrams illustrating the calculation method of the object angular velocity in the present embodiment, and are histograms in which the vertical axis shows the number of blocks from which motion vectors are detected, and the horizontal axis shows the magnitudes of vectors. FIGS. 4a-i to 4a-iii and FIGS. 4b-i to 4b-iii are for different images that have been successively acquired, the motion vectors (moving amounts v [mm] on the imaging plane) detected in step S207 are indicated by reference sign 401, the displacement amount (moving amount 1 [mm] on the imaging plane) of the shift lens position acquired in step S206 is indicated by reference sign 402, and the angular velocity (moving amount a [mm] on the imaging plane) of the image capturing apparatus 100 detected in step S203 is indicated by reference sign 403.

Figure 5:
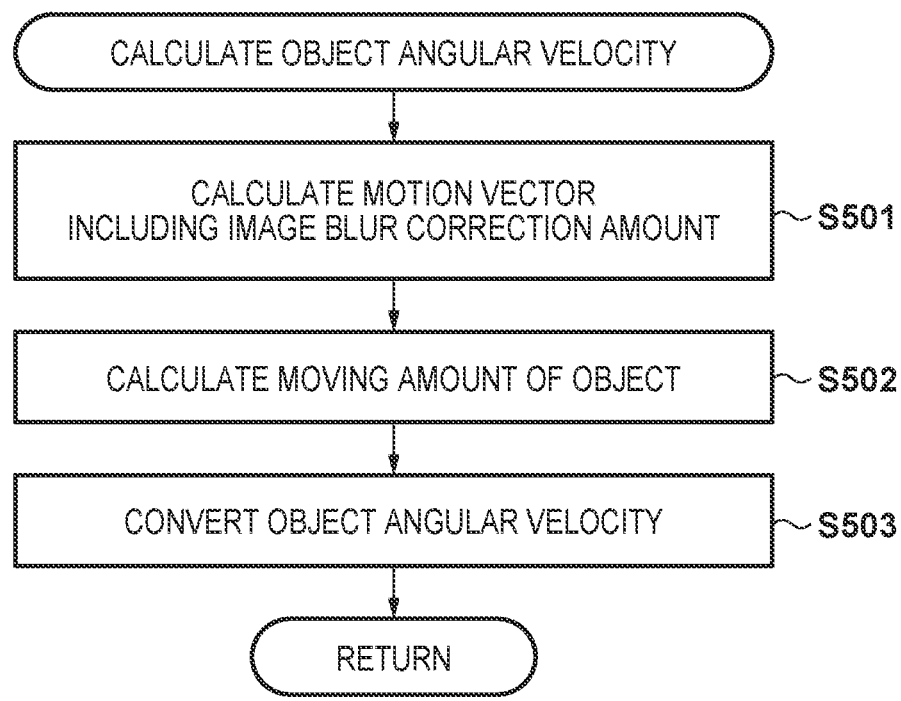
FIG. 5 is a flowchart illustrating the method of calculating the object angular velocity in the first embodiment.

FIG. 5 is a flowchart illustrating the method of calculating the object angular velocity in the present embodiment. In step S501, because the values of the motion vectors 401 become smaller than the original image shift amounts due to image blur correction, the CPU 103 calculates motion vectors 404 including the image blur correction amount by adding the displacement amount 402 of the shift lens position to each of the motion vectors 401.

In step S501, the component of the motion of the object that has not been sufficiently followed by panning the image capturing apparatus 100 is detected as the motion vectors 404 including the image blur correction amount. Therefore, in step S502, the CPU 103 calculates a moving amount 405 of the object by removing components of the motion vectors 404 including the image blur correction amount from the angular velocity 403 of the image capturing apparatus 100.

Note that, reference sign 406 indicates moving amounts of the background, and the moving amounts 405 of the object can be distinguished from the moving amounts 406 of the background using the fact that the image capturing apparatus 100 was panned so as to follow the object. For example, "motion vectors 404 including the image blur correction amount" whose magnitudes are close to the "angular velocity 403 of the image capturing apparatus 100" can be distinguished as the moving amounts 406 of the background, and vectors having a small magnitude out of the "motion vectors 404 including the image blur correction amount" can be distinguished as the moving amounts 405 of the object.

In step S503, the CPU 103 calculates the object angular velocity $\omega o$ [rad/sec] using the equation (2), where o [mm] is the moving amount 405 of the object.

$$\omega o = \text{fps} \times \tan^{-1}(o/f) \quad (2)$$

According to the above method, the object angular velocity can be calculated even if image blur correction has been performed by moving the shift lens 306 in an operation so as to follow the object before shooting by panning the image capturing apparatus.

Returning to the description of FIG. 2, in step S209 in FIG. 2, the CPU 103 determines whether or not the processing is to be shifted to the operation to start exposure. Note that, whether or not the shutter button (operation unit 111) is full-pressed (hereinafter, referred to as a switch SW2 being turned on) is determined here. In the case where the switch SW2 is not turned on, the CPU 103 repeats the operations from step S203 to step S208. When the switch SW2 is turned on, the processing advances to step S210.

Steps S210 and S211 are processes performed before exposure starts. In step S210, the CPU 103 calculates, using the image processing apparatus 106, the movement destination of the shift lens 306 at which the correction amount can be sufficiently secured, as the panning shot assistance, based on the chronological series change of the object angular velocity calculated in step S208.

Figure 6:
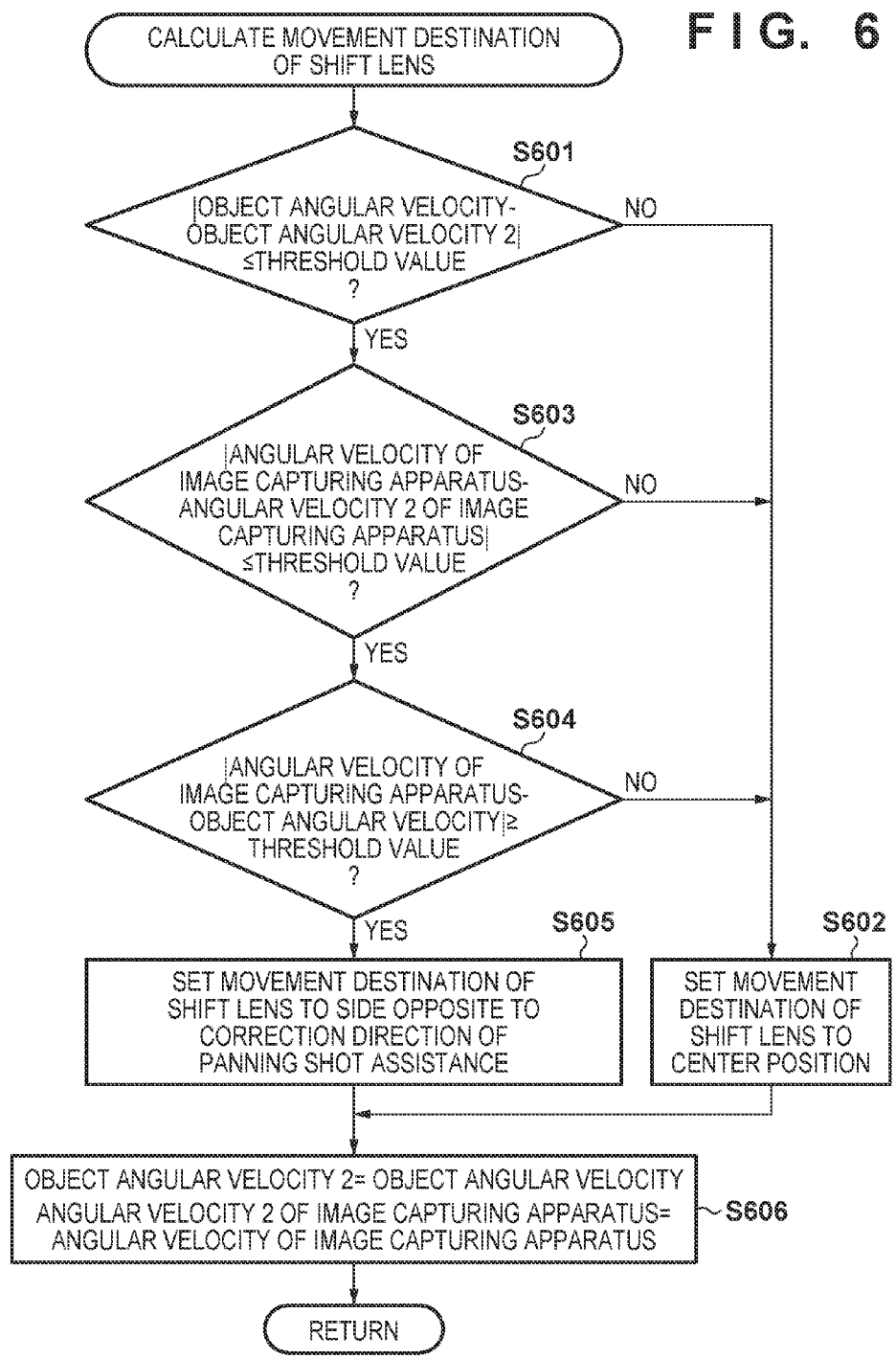
FIG. 6 is a flowchart illustrating a method of calculating a movement destination of a shift lens.

The calculation method of the movement destination of the shift lens in the present embodiment will be described using FIG. 6. FIG. 6 is a flowchart illustrating the calculation method of the movement destination of the shift lens in the present embodiment. Note that an object angular velocity 2 and an angular velocity 2 of the image capturing apparatus in FIG. 6 are initialized at the timing when the switch SW1 is turned on.

In step S601, in order to determine whether or not the object is moving at a constant speed, the CPU 103 determines whether the difference value between the object angular velocity of the current frame and the object angular velocity of the previous frame (object angular velocity 2) is a predetermined threshold value or less. When the difference value is larger than the threshold value, the motion of the object is unstable, and therefore, the processing advances to step S602, and the movement destination of the shift lens is set to a center position of the movable range in order to deal with the change in the motion of the object immediately before exposure. Also, when the difference value is the threshold value or less, that is, when the motion of the object is stable, the processing advances to step S603.

In step S603, in order to determine whether the panning speed is stable or not, the CPU 103 determines whether or not the difference value between the angular velocity of the image capturing apparatus at the current frame and the angular velocity of the image capturing apparatus at the previous frame (angular velocity 2 of the image capturing apparatus) is a threshold value or less. When the difference value is larger than the threshold value, the panning is unstable, and therefore, in order to ensure a stable assistance effect, the processing advances to step S602, and the movement destination of the shift lens is set to the center position of the movable range. Also, when the aforementioned difference value is the threshold value or less, that is, when the panning is stable, the processing advances to step S604.

In step S604, in order to determine whether the user is sufficiently following the object, the CPU 103 determines whether or not the difference value between the angular velocity of the image capturing apparatus and the object angular velocity is smaller than a threshold value. If the difference value is smaller than the threshold value, it can be determined that the user is sufficiently following the object, and correction can be sufficiently performed even if the shift lens is to be shifted from the center position. Accordingly, in order to ensure a stable assistance effect, the processing advances to step S602, and the movement destination of the shift lens is set to the center position of the movable range. Also, when the aforementioned difference value is the threshold value or more, that is, when the user is not sufficiently following the object, the processing advances to step S605.

In step S605, CPU 103 can judge, from the determinations in steps S601, S603, and S604, that the object angular velocity and the panning angular velocity are both stable, and therefore, the shift lens is set to a side opposite to the correction direction of the panning shot assistance. Accordingly, the correction effect of the panning shot assistance can be largely secured.

In step S606, the CPU 103 prepares for the processing for the next frame and onwards by updating the object angular velocity 2 and the angular velocity 2 of the image capturing apparatus. In FIG. 6, in order to facilitate understanding, determination regarding the change between two frames is performed, but the present embodiment is not limited thereto, and determination may be performed regarding a change over a plurality of prior frames. According to the above processing, the shift lens can be moved while an appropriate correction effect of the panning shot assistance is secured.

In step S211 in FIG. 2, the CPU 103 moves the shift lens 306 to the position calculated in step S210. Note that the processing in steps S210 and S211 is completed during a period from when the switch SW2 is turned on until when exposure is started.

The processing in step S212 is processing performed during exposure. In step S212, the CPU 103 moves the shift lens 306 based on the difference between the angular velocity of the image capturing apparatus 100 acquired in step S203 and the object angular velocity calculated in step S208. That is, the CPU 103 moves the shift lens 306 so as to suppress object blur in panning shot by correcting the difference between the object angular velocity and the panning angular velocity of the image capturing apparatus. According to the above processing, the panning shot can be assisted.

The processing in step S213 is processing performed after exposure has ended. In step S213, the CPU 103 absorbs the shift of the image position caused by moving the shift lens 306 in step S211 by moving the center of the image output position. Then, the CPU 103 can save an image having the angle of view equivalent to the region displayed in the display unit 109 as a result of saving the range that is the same as the image output region limited in step S201 as the image.

The processing in steps S210 to S213 in FIG. 2 will be specifically described using FIGS. 3A and 3B. Note that the following operations are characteristic operations of the first embodiment. In FIGS. 3A and 3B, reference sign 302 indicates a period from when the switch SW2 is turned on until immediately before exposure is started, and the processing in steps S210 and S211 in FIG. 2 is performed in the period 302 from when the switch SW2 is turned on until immediately before exposure is started.

Reference sign 303 in FIGS. 3A:3a-i to 3B:3b-v indicates an exposure period, and the processing in step S212 in FIG. 2 is performed during this exposure period 303. Reference sign 304 in FIGS. 3A and 3B indicates a period after exposure is completed, and the processing in step S213 in FIG. 2 is performed in the period 304 after the exposure period has ended.

First, the flow of a conventional panning shot assistance mode will be described using FIGS. 3A:3a-i to 3A:3a-iii. As already described, in the conventional flow, the shift lens is fixed during the operation (preliminary operation period 301), before exposure, in which the user follows the object by panning the camera, and therefore, the position of the object is not stable due to the influence of the camera shake 309. Therefore, correction of the panning shot assistance is performed based on the angle of view 310 shown in FIG. 3A:3a-iii when the switch SW2 is turned on.

If the object angular velocity does not match the panning angular velocity of the image capturing apparatus 100 in the exposure period 303, the object is blurred, as indicated by reference sign 312 in FIG. 3A:3a-iv. Therefore, the object blur is suppressed by moving the shift lens 306 as shown by reference sign 313 in FIG. 3A:3a-iv. Note that the shift lens 306 moves during the exposure period 303, and as a result, the position of the object is stabilized as indicated by the solid line 311 in FIG. 3A:3a-iv. In the end, an image in which the influence of the camera shake 309 during the preliminary operation period 301 remains is obtained, which thus results in an angle of view that is different from the target image 315, which is the target.

In light of the above problem, the flow of the panning shot assistance mode in the present embodiment will be described using FIGS. 3B:3b-i to 3b-v. In the present embodiment, the influence of the camera shake 309 is suppressed by moving the shift lens 306 in the operation (preliminary operation period 301), before exposure, in which the user follows the object by panning the camera. However, if the position of the shift lens 306 remains in the moved position, there may be a case where the shift lens 306 moves to the end of the movable range, as shown in FIG. 3B:3b-ii, and therefore, a sufficient effect of panning shot assistance cannot be ensured. Therefore, the shift lens 306 needs to be moved to an optimum position 321, as shown in FIG. 3B:3b-iii. As a result of this movement of the shift lens 306, the position of the object on the imaging plane is shifted, as shown in FIG. 3B:3*b-iii*, and therefore, the image output region on the imaging plane is changed, as indicated by reference sign 320.

Thereafter, if the object angular velocity does not match the panning angular velocity of the image capturing apparatus 100 in the exposure period 303, the object is blurred, as indicated by reference sign 323 in FIG. 3B:3*b-iv*. Therefore, the object blur is suppressed by moving the shift lens 306 as shown by reference sign 324 in FIG. 3B:3*b-iv*. Note that the shift lens 306 moves during the exposure period 303, and as a result the position of the object is stabilized as indicated by the solid line 322 in FIG. 3B:3*b-iv*.

In the end, as a result of moving the image output region 320, an image 325 having an angle of view that is close to that of reference sign 326, which is the target image, can be obtained, while suppressing the influence of the camera shake 309 during the preliminary operation period 301. Note that, as a result of limiting the movable range 307 of the shift lens 306 during the preliminary operation period 301 according to the size of the image output region 317 shown in FIG. 3B:3*b-i*, an assistance effect at a constant angle of view can be realized as well.

According to the operations described above, image blur correction during the preliminary operation becomes possible, while securing the necessary amount of correction to be performed by the shift lens as the panning shot assistance. Also, as a result of setting the filter characteristics so as to limit the image blur correction effect such that the image output region remains inside the range thereof, the position of the output image can be moved inside the imaging plane, and therefore, the angle of view of the final output image can be matched to that of the display image during the preliminary operation.

Second Embodiment

Next, an image capturing apparatus of a second embodiment of the present invention will be described. The configuration of the image capturing apparatus of the second embodiment is similar to the configuration of the image capturing apparatus of the first embodiment shown in FIG. 1, and therefore, the description thereof will be omitted.

Figure 7:
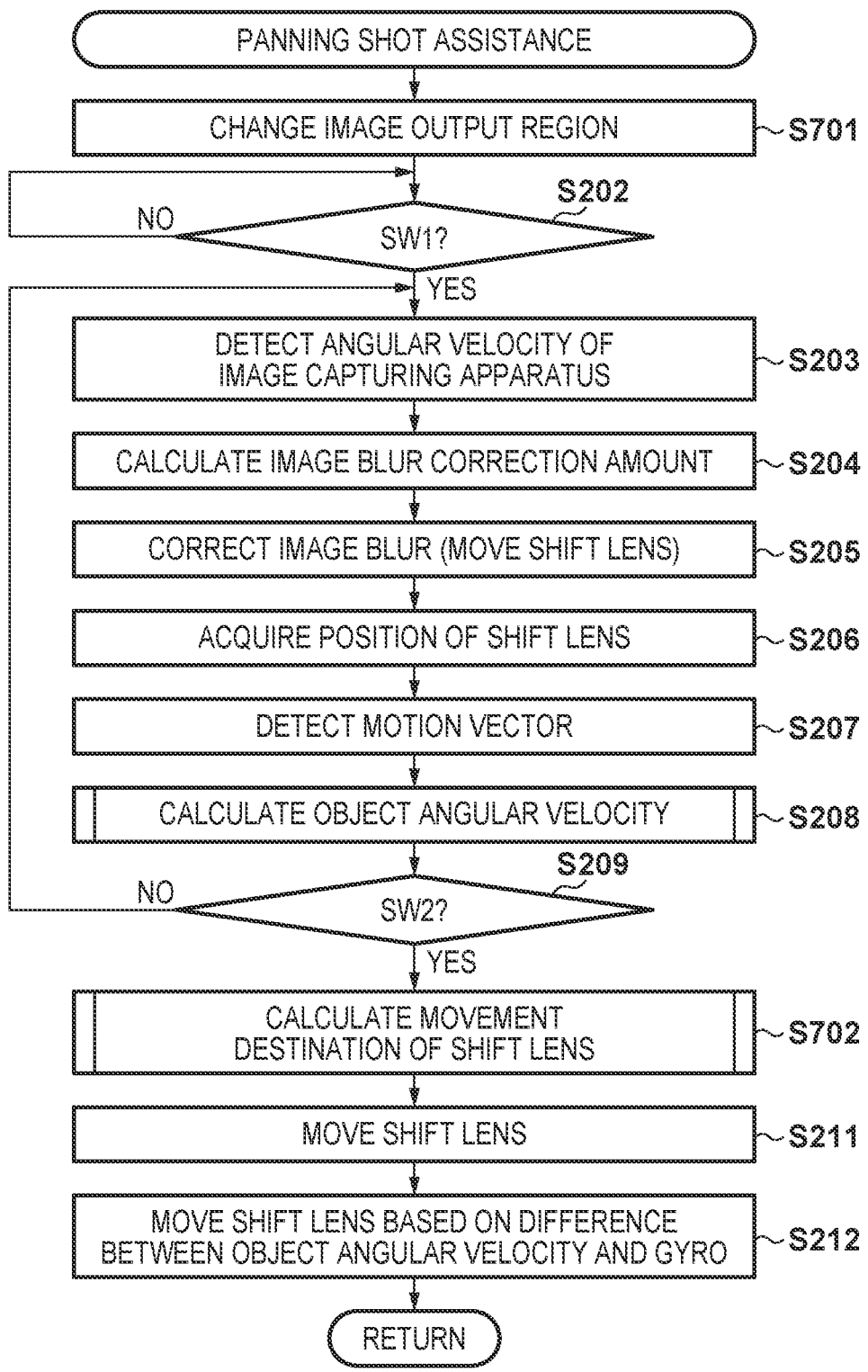
FIG. 7 is a flowchart illustrating a flow of panning shot assistance in a second embodiment.

FIG. 7 is a flowchart illustrating operations in a panning shot assistance mode in the present embodiment. First, in step S701, the CPU 103 displays, in the display unit 109, a region that can always be inside the angle of view when the shift lens 306 is moved in the panning shot assistance mode. The aforementioned setting of the display region is a point of the second embodiment. Specific operations will be described later. The operations in steps S202 to S209 are similar to those of the first embodiment described in FIG. 2, and therefore, the description thereof will be omitted.

In step S702, the CPU 103 calculates, using the image processing apparatus 106, the position of the shift lens 306 in which a sufficient correction amount can be obtained as the panning shot assistance based on the time series change of the object angular velocity calculated in step S208.

Figure 8:
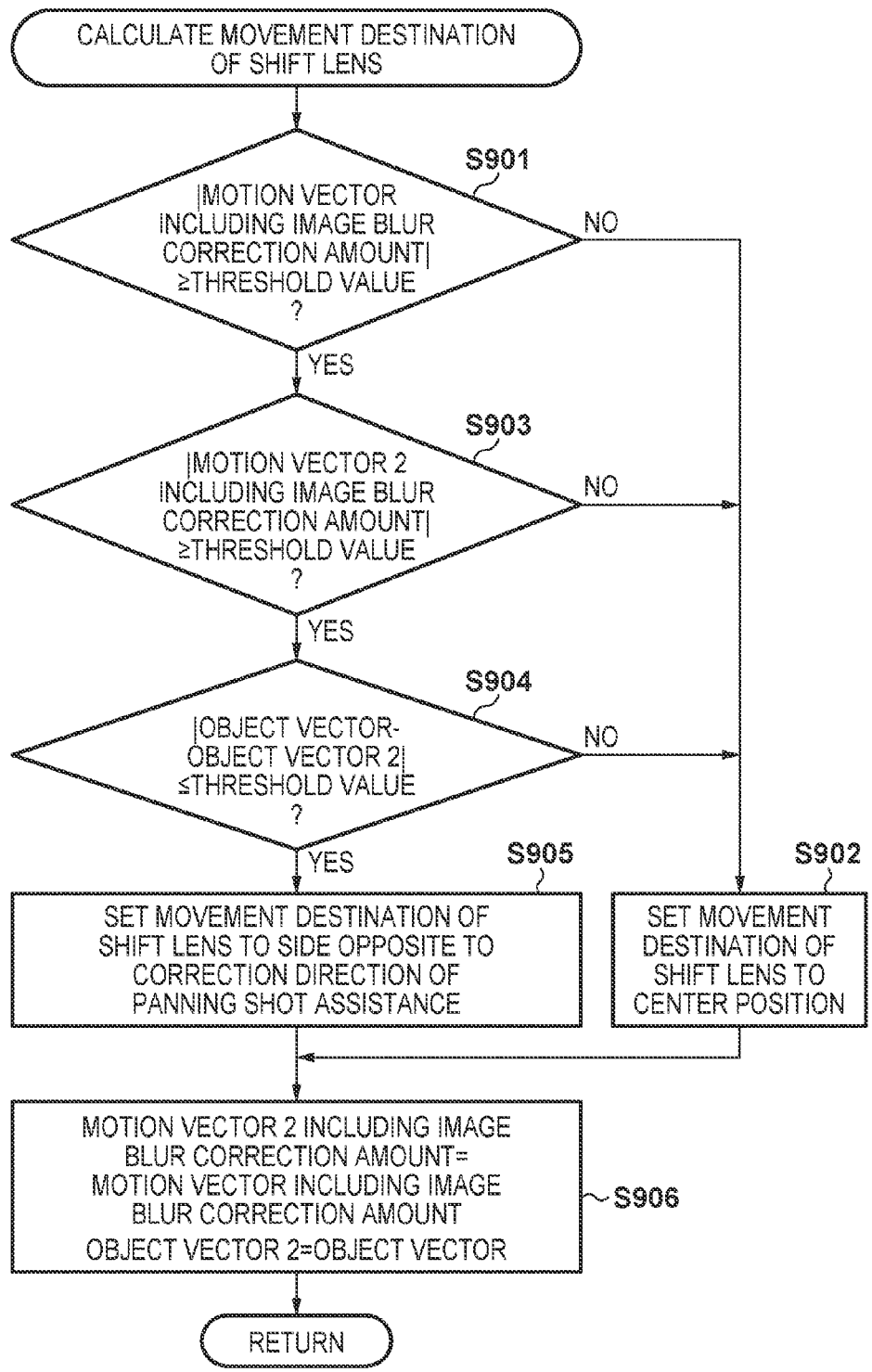
FIG. 8 is a flowchart illustrating a method of calculating a movement destination of a shift lens.

A calculation method of the movement destination of the shift lens in the present embodiment will be described using FIG. 8. FIG. 8 is a flowchart illustrating the calculation method of the movement destination of the shift lens in the present embodiment. Note that a motion vector 2 including an image blur correction amount and an object vector 2 in FIG. 8 are initialized at the timing when the switch SW1 is turned on.

In step S901, in order to determine whether or not a user is appropriately following an object, the CPU 103 determines, in the current frame, whether or not the magnitude of the motion vector of the current frame including the image blur correction amount is a threshold value or more. If the magnitude of the motion vector is less than the threshold value, it can be determined that, currently, the user is appropriately following the object, and correction can be sufficiently performed even if the shift lens is to be shifted from the center position. Accordingly, in order to ensure a stable assistance effect, the processing advances to step S902, and the movement destination of the shift lens is set to the center position of the movable range. If the magnitude of the aforementioned motion vector is the threshold value or more, that is, when the user cannot appropriately follow the object, the processing advances to step S903.

In step S903, the CPU 103 determines whether or not the determination regarding whether or not the user is appropriately following the object is different between the current frame and the previous frame. If the magnitude of the motion vector (motion vector 2) including the image blur correction amount in the previous frame is less than the threshold value, it can be determined that the user that could appropriately follow the object in the previous frame can no longer appropriately follow the object in the current frame. Therefore, in order to ensure a stable assistance effect, the processing advances to step S902, and the movement destination of the shift lens is set to the center position of the movable range. If the magnitude of the motion vector (motion vector 2) including the image blur correction amount in the previous frame is the threshold value or more, it can be determined that the user cannot appropriately follow the object in the current frame and could not appropriately follow the object in the previous frame, and therefore, the processing advances to step S904.

In step S904, in order to determine whether the object is moving at a constant speed, the CPU 103 determines whether or not the difference value between the object vector in the current frame and the object vector (object vector 2) in the previous frame is a threshold value or less. If the difference value is larger than the threshold value, that is, when the object is not moving at a constant speed, in order to ensure a stable assistance effect, the processing advances to step S902, and the movement destination of the shift lens is set to the center position of the movable range. If the aforementioned difference value is the threshold value or less, that is, when the object is moving at a constant speed, the processing advances to step S905.

In step S905, the CPU 103 can determine that, although the object angular velocity is stable, the user cannot appropriately follow the object based on the determinations in steps S901, S903, and S904, the shift lens is set to a side opposite to the correction direction of the panning shot assistance. Accordingly, the correction effect of the panning shot assistance can be largely secured.

In step S906, the CPU 103 prepares for the processing for the next frame and onwards by updating the motion vector 2 including the image blur correction amount and the object vector 2. In FIG. 8, in order to facilitate understanding, determination regarding the change between two frames is performed, but the present embodiment is not limited thereto, and determination may be performed regarding the change over a plurality of past frames. According to the above processing, the shift lens can be moved while an appropriate effect of the panning shot assistance is secured. The processing in steps S211 and S212 is similar to that in FIG. 2 in the first embodiment, and therefore, the description thereof will be omitted.

Hereinafter, points of the operations in the second embodiment will be described using FIGS. 9A:9a-i to 9B:9b-v. FIGS. 9A:9a-i to 9B:9b-v are diagrams illustrating the flow of the panning shot assistance mode in the present embodiment. FIGS. 9A:9a-i to 9a-v show the flow in a conventional panning shot assistance mode, and FIGS. 9B:9b-i to 9b-v show the flow of the panning shot assistance mode in the present embodiment. The description regarding reference signs 301 to 324 is similar to that in FIGS. 3A:3a-i to 3B:3b-v illustrating the first embodiment, and therefore, the description thereof will be omitted.

In step S701 in FIG. 7, the output region of the image is limited to a region 317 shown in FIG. 9B:9b-i. Therefore, although the position of the output region on the imaging plane moves as a result of causing the shift lens 306 to move as shown by reference sign 321 in FIG. 9B:b-iii, an image 801 that reliably includes the target angle of view 802 can be output.

According to the above processing, the image blur correction in the preliminary operation becomes possible while securing the necessary amount of correction to be performed by the shift lens as the panning shot assistance. Also, as a result of displaying a region that can always be within the angle of view when the shift lens is moved in the panning shot assistance mode, the usable region of the image after shooting can be increased, and the flexibility of post-process editing can be increased.

Note that an example in which image blur of the object is corrected by the shift lens and the panning shot assistance is performed as well has been described in the first and second embodiments described above. However, the present invention is not limited thereto, and can be implemented in a mode in which the image sensor 102 itself is shifted, or the like, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-044763, filed Mar. 8, 2016, which is hereby incorporated by reference herein in its entirety.

What is claimed is:

1. An image stabilization apparatus comprising:
at least one processor or circuit configured to perform the operations of the following units:
a first calculation unit that calculates an angular velocity of a motion of an image capturing apparatus;
a second calculation unit that calculates a motion vector of an object from a plurality of images that have been captured by an image capturing unit of the image capturing apparatus;
a third calculation unit that calculates a current position of an image stabilization unit that corrects image blur caused by the motion of the image capturing apparatus;
a fourth calculation unit that calculates an angular velocity of a motion of the object based on outputs of the first to third calculation units; and
a control unit that controls, before the image capturing apparatus is released, the image stabilization unit so as to correct an image blur based on art output of the first calculation unit, and moves, along with moving a position of the image stabilization unit at a predetermined timing after the image capturing apparatus has been released, an output position of an image from the image capturing unit based on a moving amount of the image stabilization unit calculated based on the current position calculated by the third calculation unit, and controls, after the image capturing unit has started exposure, the image stabilization unit so as to correct an image blur based on the angular velocity of the motion of the image capturing apparatus calculated by the first calculation unit and the angular velocity of the motion of the object calculated by the fourth calculation unit.

2. A control method of an image stabilization apparatus, the control method comprising:
a first calculation step of calculating an angular velocity motion of an image. capturing apparatus;
a second calculation step of calculating a motion vector of an object from a plurality of images that have been captured by an image capturing of the image capturing apparatus;
a third calculation step of calculating a current position of an image stabilization unit that corrects image blur caused by the motion of the image capturing apparatus;
a fourth calculation step of calculating an angular velocity of a motion of the object based on outputs of the first to third calculation steps; and
a control step of controlling, before the image capturing apparatus is released, the image stabilization unit so as to correct an image blur based on an output in the first calculation step, and moving, along with moving a position of the image stabilization unit at a predetermined timing after the image capturing apparatus has been released, an output position of an image from the image capturing unit based on a moving amount of the image stabilization unit calculated based on the current position calculated in the third calculation step, and controlling, after the image capturing, unit has started exposure, the image stabilization unit so as to correct an image blur based on the angular velocity of the motion of the image capturing apparatus calculated in the first calculation step and the angular velocity of the motion of the object calculated in the fourth calculation step.

3. A non-transitory computer-readable storage medium storing a program for causing a computer to execute steps of a control method of an image stabilization apparatus, the control method comprising:
a first calculation step of calculating an angular velocity of a motion of an image capturing apparatus;
a second calculation step of calculating a motion vector of an object from a plurality of images that have been captured by an image capturing unit of the image capturing apparatus;
a third calculation step of calculating a current position of an image stabilization unit that corrects image blur caused by the motion of the image capturing apparatus;
a fourth calculation step of calculating an angular velocity of a motion of the object based on outputs of the first to third calculation steps; and
a control step of controlling, before the image capturing apparatus is released, the image stabilization unit so as to correct an image blur based on an output in the first calculation step, and moving, along with moving a position of the image stabilization unit at a predetermined timing after the image capturing apparatus has been released, an output position of an image from the image capturing unit based on a moving amount of the image stabilization unit calculated based on the current position calculated in the third calculation step, and controlling, after the image capturing unit has started exposure, the image stabilization unit so as to correct an image blur based on the angular velocity of the motion of the image capturing apparatus calculated in the first calculation step and the angular velocity of the motion of the object calculated in the fourth calculation step.

4. An image stabilization apparatus comprising:
at least one processor or circuit configured to perform the operations of the following units:
a first calculation unit that calculates an angular velocity of a motion of an image capturing apparatus;
a second calculation unit that calculates a motion vector of an object from a plurality of images that have been captured by an image capturing unit of the image capturing apparatus;
a third calculation unit that calculates a current position of an image stabilization unit that corrects image blur caused by the motion of the image capturing apparatus;
a fourth calculation unit that calculates an angular velocity of a motion of the object based on outputs of the first to third calculation units; and
a control unit that controls, before the image capturing apparatus is released, the image stabilization unit so as to correct an image blur based on an output of the first calculation unit, and moves a position of the image stabilization unit towards center position of a movable range of the image stabilization unit based on an output of the third calculation unit at a predetermined timing after the image capturing apparatus has been released, and controls, after the image capturing unit has started exposure, the image stabilization unit so as to correct an image blur based on the angular velocity of the motion of the object calculated by the fourth calculation unit.

5. The image stabilization apparatus according to claim 4, wherein the control unit controls, after the image capturing unit has started exposure, the image stabilization unit so as to correct an image blur based on a difference between the angular velocity of the motion of the image capturing apparatus calculated by the first calculation unit and the angular velocity of the motion of the object calculated by the fourth calculation unit.

6. The image stabilization apparatus according to claim 4, wherein the third calculation unit calculates a current position of the image stabilization unit in accordance with a period of acquiring frames.

7. The image stabilization apparatus according to claim 4, wherein the second calculation unit calculates a motion vector of the object from two or more images.

8. The image stabilization apparatus according to claim 4, wherein the predetermined timing is a timing during a period from when the image capturing apparatus is released until when the image capturing unit starts exposure.

9. The image stabilization apparatus according to claim 8, wherein the control unit moves, at the predetermined timing, the image stabilization unit to a center position of a movable range of the image stabilization unit, or to a position at which a motion amount of a movement of the image stabilization unit can be secured after the image capturing apparatus is released.

10. The image stabilization apparatus according to claim 9, wherein the control unit switches a position to which the image stabilization unit is to be moved between the center position of the movable range of the image stabilization unit, or to the position at which the motion amount of the movement of the image stabilization unit can be secured after the image capturing apparatus is released, based on the angular velocity of the motion of the image capturing apparatus calculated by the first calculation unit and the angular velocity of the motion of the object calculated by the fourth calculation unit.

11. The image stabilization apparatus according to claim 9, wherein the control unit switches a position to which the image stabilization unit is to be moved between the center position of the movable range of the image stabilization unit, or to the position at which the motion amount of the movement of the image stabilization unit can be secured after the image capturing apparatus is released, based on a change in the motion vector calculated by the second calculation unit.

12. The image stabilization apparatus according to claim 4, wherein the control unit, in a case of moving an output position of an image from the is capturing unit, moves the output position of the image by extracting a necessary region from an entire image region of the image capturing unit.

13. The image stabilization apparatus according to claim 12, further comprising a fifth calculation unit that calculates a moving amount of the image stabilization unit by performing predetermined filtering processing on the output of the first calculation unit.

14. The image stabilization apparatus according to claim 13, wherein, in the predetermined filtering processing, a filtering characteristic is changed so that the moving amount of the image stabilization unit to be in a range such that the region to be extracted is from the entire image region of the image capturing unit.

15. The image stabilization apparatus according to claim 12, wherein the control unit extracts only the necessary region and causes a display apparatus to display the region.

16. A control method of an image stabilization apparatus, the control ruethod comprising:
a first calculation step of calculating an angular velocity of a motion of an image capturing apparatus;

a second calculation step of calculating a motion vector an object from a plurality of images that have been captured by an image capturing unit of the image capturing apparatus;

a third calculation step of calculating a current position of an image stabilization unit that corrects image blur caused by the motion of the image capturing apparatus;

a fourth calculation step of calculating an angular velocity of a motion of the object based on outputs of the first to third calculation steps; and a control step of controlling, before the image capturing apparatus is released, the image stabilization unit so as to correct an image blur based on an output in the first calculation step, and moving a position of the image stabilization unit towards center position of a movable range of the image stabilization unit based on an output of the third calculation step at a predetermined timing after the image capturing apparatus has been released, and controlling, after the image capturing unit has started exposure, the image stabilization unit so as to correct an image blur based on the angular velocity of the motion of the object calculated in the fourth calculation step.

17. A non-transitory computer-readable storage medium storing a program for causing a computer to execute steps of a control method of an image stabilization apparatus, the control method comprising:

a first calculation step of calculating an angular velocity of a motion of an image capturing apparatus;

a second calculation step of calculating a motion vector of an object from a plurality of images that have been captured by an image capturing unit of the image capturing apparatus;

a third calculation step of calculating a current position of an image stabilization unit that corrects image blur caused by the motion of the image capturing apparatus;

a fourth calculation step of calculating an angular velocity of a motion of the object based on outputs of the first to third calculation steps; and a control step of controlling, before the image capturing apparatus is released, the image stabilization unit so as to correct an image blur based on an output in the first calculation step, and moving a position. of the image stabilization unit towards center position of a movable range of the image stabilization unit based on an output of the third calculation step at a predetermined timing after the image capturing apparatus has been released, and controlling, after the image capturing unit has started exposure, the image stabilization unit so as to correct an image blur based on the angular velocity of the motion of the object calculated in the fourth calculation step.

* * * * *